(12) United States Patent
Wyatt et al.

(10) Patent No.: US 9,936,191 B2
(45) Date of Patent: Apr. 3, 2018

(54) COCKPIT DISPLAY SYSTEMS AND METHODS FOR GENERATING COCKPIT DISPLAYS INCLUDING ENHANCED FLIGHT VISIBILITY INDICATORS

(71) Applicant: HONEYWELL INTERNATIONAL INC., Morris Plains, NJ (US)

(72) Inventors: Ivan Sandy Wyatt, Scottsdale, AZ (US); David Allen Tunheim, Scottsdale, AZ (US); Gang He, Morristown, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 194 days.

(21) Appl. No.: 15/007,673

(22) Filed: Jan. 27, 2016

(65) Prior Publication Data
US 2017/0214904 A1 Jul. 27, 2017

(51) Int. Cl.
*H04N 13/04* (2006.01)
*B64D 43/00* (2006.01)
(Continued)

(52) U.S. Cl.
CPC ......... *H04N 13/0402* (2013.01); *B64D 43/00* (2013.01); *G08G 5/0047* (2013.01); *G06F 1/163* (2013.01); *G06T 15/005* (2013.01)

(58) Field of Classification Search
CPC .. H04N 13/0402; B64D 43/00; G08G 5/0047; G06T 15/005; G06F 1/163
See application file for complete search history.

(56) References Cited

U.S. PATENT DOCUMENTS 5,593,114 A * 1/1997 Ruhl .................... G05D 1/0676
244/183
7,557,734 B2 7/2009 Estrada, III et al.
(Continued)

FOREIGN PATENT DOCUMENTS

EP 2416124 A2 2/2012

OTHER PUBLICATIONS

Extended EP Search Report for Application No. 17151291.6-1557 dated Jun. 14, 2017.
(Continued)

*Primary Examiner* — Russell Frejd
(74) *Attorney, Agent, or Firm* — Lorenz & Kopf, LLP

(57) ABSTRACT

Cockpit display systems and methods are provided for generating cockpit displays including symbology useful in assessing whether enhanced flight visibility requirements are satisfied during approach and landing. In one embodiment, the cockpit display system includes an Enhanced Flight Vision System (EFVS) sensor configured to monitor a region forward of the aircraft for runway reference features, a cockpit display device on which an EFVS image is generated utilizing EFVS sensor data, and a controller coupled to the EFVS sensor and to the display device. The controller determines an enhanced flight visibility requirement for a runway approached by the aircraft, and then visually indicates on the EFVS image whether the enhanced flight visibility requirement is currently satisfied by, for example. generating an enhanced flight visibility indicator (EFVI) graphic on the EFVS image visually identifying a ground location beyond which the appearance of a runway reference feature satisfies the enhanced flight visibility requirement.

20 Claims, 4 Drawing Sheets

(51) Int. Cl.
  *G08G 5/00* (2006.01)
  *G06T 15/00* (2011.01)
  *G06F 1/16* (2006.01)

(56) References Cited

U.S. PATENT DOCUMENTS

| | | | | |
|---|---|---|---|---|
| 7,605,719 | B1* | 10/2009 | Wenger | G01C 23/00 |
| | | | | 340/974 |
| 7,693,621 | B1 | 4/2010 | Chamas | |
| 7,965,223 | B1* | 6/2011 | McCusker | G01S 13/913 |
| | | | | 340/961 |
| 8,175,761 | B2* | 5/2012 | Nichols | G01C 23/00 |
| | | | | 345/418 |
| 8,195,347 | B2 | 6/2012 | Boorman | |
| 8,487,787 | B2* | 7/2013 | Best | G02B 27/0093 |
| | | | | 340/933 |
| 8,676,399 | B2* | 3/2014 | Nutaro | G08G 5/0021 |
| | | | | 701/1 |
| 9,013,330 | B2* | 4/2015 | Nutaro | G08G 5/065 |
| | | | | 340/945 |
| 9,092,975 | B2 | 7/2015 | Pepitone et al. | |
| 9,174,746 | B1* | 11/2015 | Bell | G01C 23/00 |
| 9,418,408 | B1* | 8/2016 | Thompson | G06T 5/009 |
| 9,532,013 | B1* | 12/2016 | McCusker | H04N 7/183 |
| 9,746,343 | B1* | 8/2017 | Barber | G01C 23/005 |
| 2011/0196598 | A1* | 8/2011 | Feyereisen | G01C 21/00 |
| | | | | 701/120 |
| 2011/0282580 | A1* | 11/2011 | Mohan | G01C 21/005 |
| | | | | 701/472 |
| 2012/0140125 | A1* | 6/2012 | Pepitone | G02B 27/0149 |
| | | | | 348/794 |
| 2013/0231853 | A1* | 9/2013 | Feyereisen | G01C 21/00 |
| | | | | 701/120 |

OTHER PUBLICATIONS

Estrada, A. et al.; A Proof of Concept of an Airborne Visibility Indicator; USAARL Report No. 2004-15; Aircrew Health and Performance Division; Apr. 2004, pp. 1-46.

* cited by examiner

COCKPIT DISPLAY SYSTEMS AND METHODS FOR GENERATING COCKPIT DISPLAYS INCLUDING ENHANCED FLIGHT VISIBILITY INDICATORS

TECHNICAL FIELD

The following disclosure relates generally to cockpit display systems and, more particularly, to cockpit display systems and methods for generating three dimensional cockpit displays including symbology useful in assessing whether enhanced flight visibility requirements are satisfied during approach and landing.

BACKGROUND

An Enhanced Flight Vision System (EFVS) generates a three dimensional image of a flight environment utilizing sensor data received from a forward-looking sensor carried by an aircraft. The forward-looking sensor can be, for example, an infrared camera or a millimeter wave radar located within a radome beneath the aircraft. The EFVS image can be generated on either a Head Up Display (HUD) or a Head Down Display (HDD) device. Additionally, in certain implementations, the EFVS image can be combined with a database-dependent Synthetic Vision System (SVS) image to yield a Combined Vision System (CVS) display. For example, a Combined Vision Primary Flight Display (CVPFD) can be produced by inserting an EFVS image into a central portion of a larger SVS image, which includes synthetic terrain and other features simulating the aircraft flight environment. The larger database-dependent SVS image provides a contextual view exceeding the scope of the EFVS image, while the central EFVS image provides real time, sensor-derived visual information more closely resembling the actual flight environment of the aircraft. The EFVS image may thus visually indicate any intruder aircraft, ground vehicles, or other obstacles that might not otherwise be present on a PFD generated purely as an SVS image.

Whether generated as a standalone image or integrated into a CVS display, an EFVS image provides a sensor-enhanced view of a region forward of an aircraft. Such an EFVS image is usefully relied upon when piloting an aircraft through approach and landing under low visibility, Instrument Metrological Conditions (IMC). The range of the forward-looking EFVS sensor can also be reduced under IMC, however. Regulations have thus been established by regulatory authorities (e.g., the Federal Flight Administration in the United States) requiring a pilot to verify that the EFVS sensor range meets or exceeds a published value (referred to herein as the "visibility requirement") prior to descent below the decision altitude on approach. The visibility requirement may be specified as a particular distance assigned to the runway approached by the aircraft for landing. To satisfy the visibility requirement, the EFVS sensor should be able to detect prominent unlighted objects by day and prominent lighted objects by night beyond the specified distance. While such regulations are clear, it may be difficult for a pilot to accurately determine whether such regulations are satisfied under IMC as visual references for estimating the distance between the aircraft and lighted objects ahead of the aircraft are often sparse or nonexistent. A pilot may consequently be forced to resort to imprecise, subjective judgments when performing this task.

It is thus desirable to provide cockpit display systems and methods for generating three dimensional cockpit displays including EFVS images, which include additional symbology enabling a pilot to quickly and accurately assess whether enhanced flight visibility requirements are satisfied during approach and landing. Other desirable features and characteristics of the present invention will become apparent from the subsequent Detailed Description and the appended Claims, taken in conjunction with the accompanying Drawings and the foregoing Background.

BRIEF SUMMARY

Cockpit display systems are provided for generating three dimensional (3D) cockpit displays including symbology useful in assessing whether enhanced flight visibility requirements are satisfied during approach and landing. In one embodiment, the cockpit display system includes an Enhanced Flight Vision System (EFVS) sensor configured to monitor a region forward of the aircraft for runway reference features, a cockpit display device on which an EFVS image is generated utilizing data received from the EFVS sensor, and a controller operably coupled to the EFVS sensor and to the cockpit display device. The controller determines an enhanced flight visibility requirement for a runway approached by the aircraft for landing, and then provides visual information on the EFVS image indicative of whether enhanced flight visibility requirement is currently satisfied for the runway approach by the aircraft. The visual information can be, for example, a textual annunciation or message indicating whether an enhanced flight visibility requirement is satisfied for the approached runway. Additionally or alternatively, the controller can generate the EFVS image to include an enhanced flight visibility indicator (EFVI) graphic, which visually expresses the enhanced flight visibility requirement for the approached runway. For example, the EFVI graphic may be generated as a flight visibility marker, which visually identifies a ground location beyond which the appearance of an approach landing light or another runway reference feature satisfies the enhanced flight visibility requirement for the approached runway.

In a further embodiment, the cockpit display system includes a forward-looking sensor configured to monitor a region forward of the aircraft for runway approach lights, a cockpit display device on which a 3D cockpit display (e.g. an EFVS display, a Combined Vision Primary Flight Display, or the like) is generated utilizing data received from the forward-looking sensor, and a controller operably coupled to the forward-looking sensor and to the cockpit display device. The controller is configured to determine an enhanced flight visibility requirement for a runway approached by the aircraft for landing, typically in low visibility conditions. The controller can determine the enhanced flight visibility requirement by, for example, receiving data indicated of the enhanced flight visibility requirement for the approached runway from a remote source, such as Air Traffic Control, or by recalling an enhanced flight visibility requirement corresponding to the approach runway from a database onboard the aircraft. After determining the enhanced flight visibility requirement, the controller generates on the 3D cockpit display: (i) approach light graphics representative of runway approach lights detected by the forward-looking sensor and (ii) a marker visually identifying a ground location beyond which the appearance of an approach light graphic satisfies the enhanced flight visibility requirement.

Methods carried-out by cockpit display systems onboard aircraft are further provided. The cockpit display system may include a cockpit display device, an EFVS sensor configured to monitor a region forward of the aircraft for runway reference features, and a controller operably coupled to the cockpit display device and to the forward-looking sensor. In one embodiment, the method includes the steps or processes of: (i) generating an EFVS image on the cockpit display device utilizing data received from the EFVS sensor; (ii) at the controller, determining an enhanced flight visibility requirement for a runway approached by the aircraft for landing; and (iii) producing an enhanced flight visibility indicator (EFVI) graphic on the EFVS image indicative of the enhanced flight visibility requirement.

BRIEF DESCRIPTION OF THE DRAWINGS

At least one example of the present invention will hereinafter be described in conjunction with the following figures, wherein like numerals denote like elements, and.

DETAILED DESCRIPTION

Figure 1:
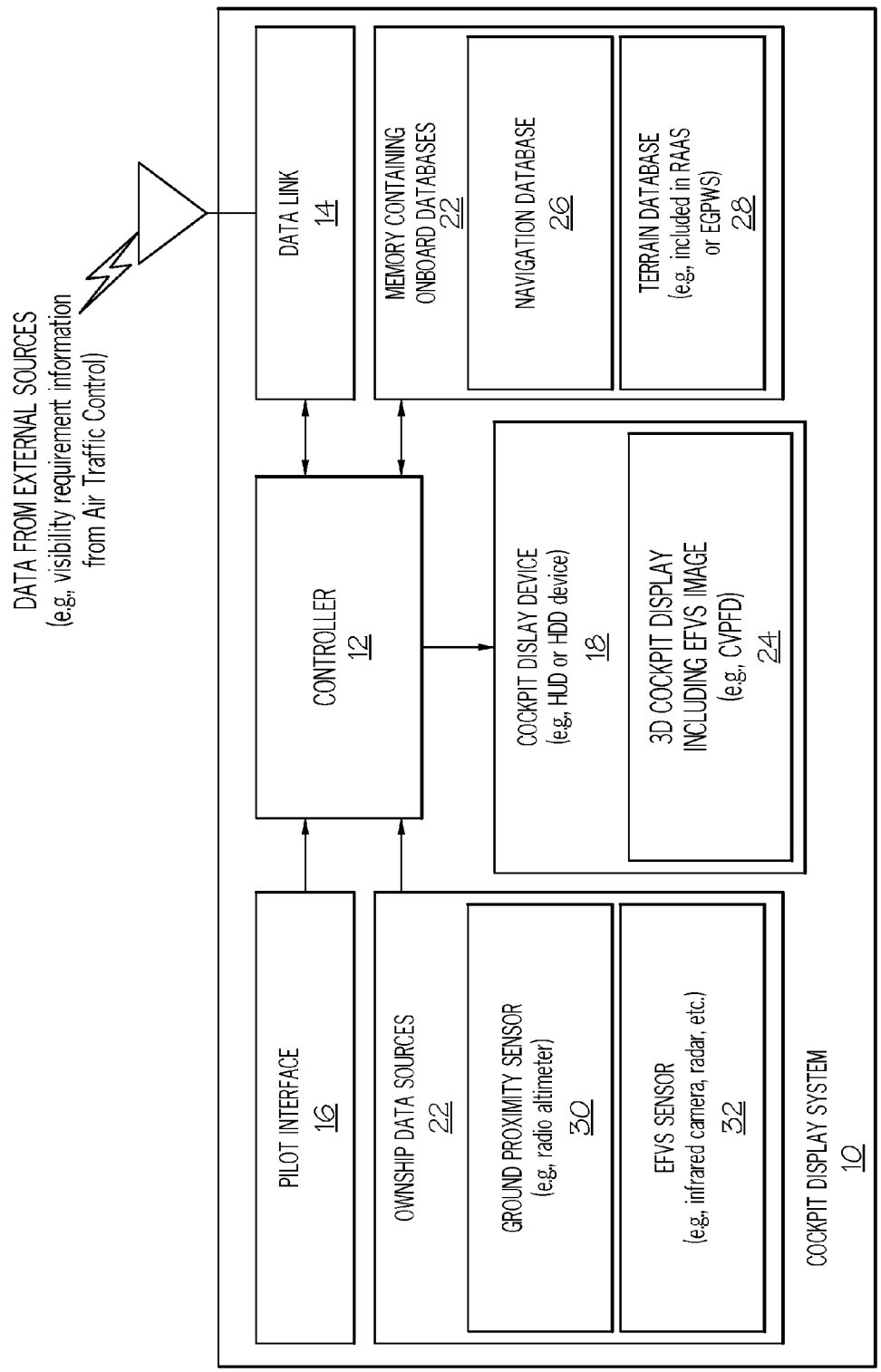
FIG. 1 is a block diagram of a cockpit display system suitable for generating a three dimensional cockpit display including an Enhanced Flight Vision System (EFVS) image and an enhanced flight visibility indicator (EFVI) graphic useful in assessing satisfaction of visibility requirements during approach under Instrument Metrological Conditions (IMC), as illustrated in accordance with an exemplary embodiment of the present invention.

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect.

The following describes cockpit display systems and methods for generating three dimensional (3D) cockpit displays including symbology useful in assessing whether enhanced flight visibility requirements are satisfied during approach and landing. The 3D cockpit display can be, for example, a Combined Vision Primary Flight Display (CVPFD) or other display including or consisting of an Enhanced Flight Vision System (EFVS) image. During operation, embodiments of the cockpit display system may initially determine an enhanced flight visibility requirement for a runway approached for landing by the aircraft equipped with the display system (referred to herein as the "ownship aircraft"). The enhanced flight visibility requirement may be determined based upon information stored in one or more databases onboard the ownship aircraft (A/C), from data wirelessly transmitted to the ownship A/C from an external source (e.g., Air Traffic Control), and/or from pilot input data. The cockpit display system may then generate the 3D cockpit display to visually indicate whether enhanced flight visibility requirement is currently satisfied for the runway approach by the ownship A/C. In certain embodiments, this may be accomplished by generating the EFVS image to include an enhanced flight visibility indicator (EFVI) graphic indicative of the enhanced flight visibility requirement. The EFVI graphic can be produced as, for example, a flight visibility marker visually identifying a ground location beyond which the appearance of a runway reference feature satisfies the flight visibility requirement. In this manner, a pilot can quickly ascertain whether a given enhanced runway visibility requirement has been satisfied when a graphic representative of a runway approach light or other runway reference feature can be seen on the 3D cockpit display at a location at or beyond the EFVI graphic. As a result, a pilot need only glance at the EFVI graphic to determine whether a particular flight visibility requirement has been met when, for example, flying an approach under Instrument Metrological Conditions (IMC). Pilot workload is reduced as a result, while the likelihood of conformance with relevant regulations is increased.

In further embodiments, the cockpit display system can generate other graphics or visual elements on the 3D cockpit display indicating whether an enhanced flight visibility requirement for a runway approach by the ownship A/C is currently satisfied. In such embodiments, the cockpit display system can process the data provided by the EFVS sensor or analyze the EFVS image to identify the distance between a present position of the ownship A/C and the lighting signature located furthest from the present A/C position. This distance may then be compared with the enhanced visibility requirement for the approached runway to determine whether the enhanced visibility requirement is satisfied. The cockpit display system can then generate the EFVS image or, more generally, the 3D cockpit display to include additional graphics or a text annunciation indicating whether the enhanced visibility requirement is satisfied for the approached runway. In such embodiments, the cockpit display system may or may not generate the EFVS image to include an EFVI graphic, as described more fully below.

FIG. 1 is a schematic of a cockpit display system 10, as illustrated in accordance with an exemplary embodiment of the present invention. Cockpit display system 10 includes the following components, each of which may be comprised of multiple devices, systems, or elements: (i) a controller 12, (ii) a datalink 14 coupled to an input and output of controller 12, (iii) a pilot interface 16 coupled to an input of controller 12, (iv) at least one cockpit display device 18 coupled to one or more outputs of controller 12, (v) a database-containing memory 20 coupled to an input of controller 12, and (vi) ownship data sources 22 coupled to various inputs of controller 12. The components of display system 10 can be interconnected utilizing any suitable aircraft architecture, which may include physical connections (e.g., provided through an avionic data bus) and/or wireless connections. The components of the exemplary cockpit display system 10 shown in FIG. 1 are each described, in turn, below.

As generically illustrated in FIG. 1, controller 12 can be implemented utilizing any suitable number of individual microprocessors, navigational equipment, memories, power supplies, storage devices, interface cards, and other standard components known in the art. In this regard, controller 12 (and the generic term "controller" appearing in this document) encompasses systems or distributed processing architectures including multiple discrete controllers or processing devices, which are operatively interconnected to perform the various methods, process tasks, calculations, and display functions described herein. Furthermore, controller 12 may include or cooperate with any number of software programs (e.g., flight deck programs), firmware programs, or other computer-readable instructions designed to carry-out the below-described functions.

Cockpit display device 18 can assume the form of any image-generating device, which operates within an A/C cockpit and on which a 3D cockpit display is produced including an EFVS image 24 (described below). Cockpit display device 18 can be, for example, a Head Up Display (HUD) device or a Head Down Display (HDD) device mounted within the cockpit of the A/C in a manner not intended for pilot removal. In certain implementations, cockpit display device 18 may be a pilot-worn display device, such as a near-to-eye or helmet-mounted display device. As a still further possibility, cockpit display device 18 can assume the form of a portable electronic display device, such as a tablet computer or Electronic Flight Bag (EFB), which communicates with the aircraft avionics over a physical or wireless connection when operating within the A/C cockpit. In certain embodiments, such as when display device 18 is HUD device, the screen of cockpit display device 18 can be fully or partially transparent, in which case the EFVS image including the below-described EFVI graphic can be superimposed on over the real world view of a runway and its surrounding environment, as seen through the display screen.

Memory 20 can include any number of individual storage devices or volatile and/or non-volatile memory elements, which may be distributed throughout the A/C cockpit or otherwise deployed onboard the ownship A/C. Generally, memory 20 will often include a central processing unit register, a number of temporary storage areas, and a number of permanent storage areas that store the data and programming required for operation of controller 12. Memory 22 stores one or more databases containing various collections of information pertaining to the operational environment of the ownship A/C. For example, and as indicated in FIG. 1, memory 20 can contain a navigation database 26 and a terrain database 28. Navigation database 26 can include information pertaining to waypoints, airways, navigation aids, runways, and airports, to list but a few examples. By comparison, terrain database 28 may also store information pertaining to runways and airports in addition to other terrain-related data, such as topological and terrain data. As can the other components of cockpit display system 10, navigation database 26 and terrain database 28 can be shared by or included within other systems onboard the ownship A/C and utilized by system 10 on an as-needed basis. In one implementation, navigation database 26 is included within a non-illustrated Flight Management System (FMS), while terrain database 28 is included within an Enhanced Ground Proximity Warning System (EGPWS) and/or a Runway Awareness and Advisory System (RAAS).

Ownship data sources 24 include a constellation of various sensors and devices for monitoring the operational state of the ownship A/C, the current A/C flight parameters, meteorological conditions, and so on. It will be appreciated that the number of sensors (and other data generating devices) onboard modern aircraft is typically quite numerous and, thus, the various sensors will not be described or will only be briefly described herein. Two sensors or data sources are specifically illustrated in FIG. 1 and discussed below as they may have particular relevance in at least some embodiments of cockpit display system 10. These sensors are a ground proximity sensor 30 and a forward-looking sensor 32 (referred to hereafter as the "EFVS sensor"). The specific illustration of these sensors in FIG. 1 and the discussion of these sensors below does not indicate that cockpit display system 10 necessarily includes such sensors in all embodiments or that system 10 cannot rely upon data received from other sensors in generating the below-described cockpit displays.

With continued reference to cockpit display system 10 shown in FIG. 1, ground proximity sensor 30 can assume the form of any device or sensor that directly detects or otherwise generates data useful in determining the current A/C altitude and, specifically, the current A/C height above a threshold region of an approached runway. Ground proximity sensor 30 can be a radio altimeter, a Global Positioning Systems (GPS) device, or another device suitable for performing this function. By comparison, EFVS sensor 32 can be any forward-looking sensor, sensor array, or combination of sensors suitable for monitoring a region forward of the ownship A/C for ground features associated with a runway (referred to herein as "runway reference features"). For example, EFVS sensor 32 can be a camera, such as an infrared or near infrared camera; a radar device, such as a Millimeter Wave (MMW) radar; or a combination thereof. In one embodiment, EFVS sensor 32 is a radar or lidar-type device, which provides data utilized to map a region forward of the ownship A/C into a 3D topographic representation then rendered. In such an embodiment, the detected airport environment features can appear as additional 3D graphic features generated on 3D cockpit display 24. EFVS sensor 32 can be contained within a radome located on the underside of the ownship A/C. On approach under IMC, the runway reference features detected by EFVS sensor 32 will typically be lighted objects associated with the runway, such as runway approach lights having heat signatures detectable by sensor 32. However, the possibility that EFVS sensor 32 can detect other ground features associated with a runway and corresponding graphics or symbology may then be generated on cockpit display 24 is not precluded.

During operation of cockpit display system 10, controller 12 utilizes the data supplied by EFVS sensor 32 to produce an EVFS image on cockpit display device 18. As generically indicated in FIG. 1, the EFVS image can make-up the entirety or only a portion of 3D cockpit display 24 generated on cockpit display device 18. In embodiments wherein the EFVS image constitutes the entirety or substantial entirety of cockpit display 24, 3D cockpit display 24 may be simply referred to as an "EFVS display." Alternatively, in embodiments wherein the EFVS image is combined with another type of display image, such as an SVS image, 3D cockpit display 24 may be referred to as a "Combined Vision System display" or, more simply, a "CVS display." Finally, as indicated above, 3D cockpit display 24 may be referred to as a "CVPFD" when generated as a PFD including both an EFVS image and a SVS image. Examples of CVPFD images that may be generated by on cockpit display device 18 by cockpit display system 10 will now be described in conjunction with FIGS. 2-5, as will examples of EFVI graphics that can be included in the CVPFD images generated by display system 10. The following examples notwithstanding, it is emphasized that cockpit display system 10 can be utilized to generate various other types of 3D cockpit displays including or consisting of EFVS images in further embodiments. For example, in a different, but equally viable implementation, cockpit display system 10 can generate an EFVS display (including the below-described EFVI graphic) on a HUD display device worn by the pilot or affixed to the A/C.

Figure 2:
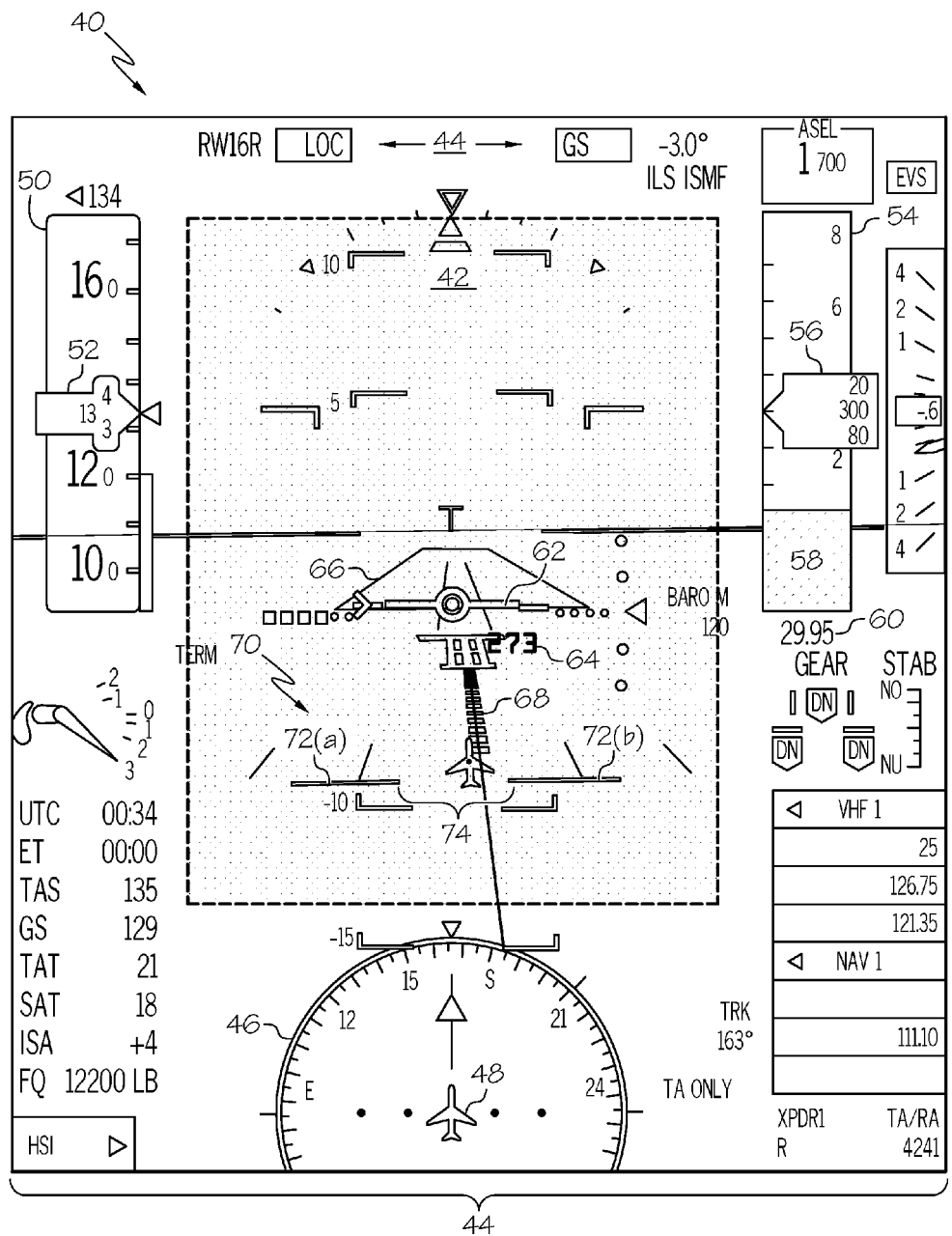
FIG. 2 is a screenshot of an exemplary Combined Vision Primary Flight Display (CVPFD) generated by the cockpit display system shown in FIG. 1 and including an EFVI graphic, as illustrated in accordance with an exemplary embodiment of the present invention.

Advancing to FIG. 2, there is shown a screenshot of an exemplary CVPFD 40 generated on cockpit display device 18 during operation of cockpit display system 10 (FIG. 1), as illustrated in accordance with an exemplary and non-limiting embodiment of the present invention. CVPFD 40 may thus correspond with 3D cockpit display 24 shown in FIG. 1, although different reference numerals are utilized to emphasize that the appearance of the CVPFD and the below-described EFVI graphic will vary amongst different embodiments. As can be seen, CVPFD 40 is generated in a 3D, perspective view format from the vantage point of the aircraft. In further embodiments, CVPFD 40 can be generated from other vantage points, such as that of a chase plane following the ownship A/C. An EFVS image 42 and an SVS image 44 are integrated or combined to produce CVPFD 40. For example, EFVS image 42 may be a smaller, centralized image that is inserted into (e.g., scaled, aligned, and blended with) with the larger SVS image 44. As previously described, EFVS image 42 is generated utilizing real time data received from EFVS sensor 34 (FIG. 1) to provide a pilot with visual information more closely resembling the actual flight environment of the ownship A/C. The larger SVS image 44 is generated utilizing information contained within one or more databases, such as navigational database 26 and/or terrain database 28 (FIG. 1), and provides a broader context in which the focused EFVS image 42 can be better understood.

CVPFD 40 includes various graphic elements and symbology that visually convey the current flight parameters of the ownship A/C. Many of the graphic elements of CVPFD 40 are well-known within the avionics industry and will not be described in detail herein. However, for completeness, it is briefly noted that the illustrated CVPFD 40 contains the following graphic elements: (i) a compass 46 centered about an A/C icon 48 (located in the bottom center of CVPFD 40); (ii) an airspeed indicator or "airspeed tape" 50, which features a precision readout window 52 (located in the upper left corner of CVPFD 40); (iii) an altitude indicator or "altitude tape" 54, which features a precision readout window 56 (located in the upper right corner of CVPFD 40) and a ground filled region 58; (iv) a barometric pressure setting readout 60 (located beneath altitude tape 54); (v) a flight path vector icon or flight path marker 62, which moves across CVPFD 40 to reflect changes in the flight path of the ownship A/C; and (vi) a height-above-ground readout 64 (e.g., a radio altimeter indicator) expressing the current A/C height-above-ground in feet.

In the scenario illustrated in FIG. 2, the ownship A/C is presently approaching a runway for landing. Accordingly, CVPFD 40 is produced to include a runway graphic 66 representative of the runway approached by the ownship A/C. Although appearing within EFVS image 42 of CFPFD 40, the runway represented by graphic 66 may or may not be detected by EFVS sensor 32. Instead, runway graphic 66 may thus be generated based upon database information stored within memory 22 (FIG. 1), as may certain other elements appearing in EFVS image 42, which is combined or "blended" with the larger SVS image 44. Comparatively, the appearance of runway reference features apart from runway graphic 66, such as approach light graphics, indicates that such features are detected by EFVS sensor 32. Thus, as shown in FIG. 2, the appearance of approach light graphics 68 within EFVS image 42 indicates that runway approach lights corresponding with graphics 68 are currently detected by EFVS sensor 32. In this particular example, approach light graphics 68 visually depict all of the runway approach lights thereby indicating that the runway approach lights are all currently detected by EFVS sensor 32. However, in other scenarios, it may be the case that relatively few, if any runway approach lights are detected by EFVS sensor 32 and graphically represented on EFVS image 42, as described below in conjunction with FIGS. 4 and 5.

In the illustrated embodiment, and by way of non-limiting example only, controller 12 further generates CVPFD 40 to include an EFVI graphic 70. EFVI graphic 70 can be generated as an enhanced flight visibility marker, which visually identifies a ground location beyond which the appearance of a graphic representative of a runway reference feature satisfies the flight visibility requirement. For this reason, EFVI graphic 70 will be referred to as "flight visibility marker 70" hereafter. This notwithstanding, it is emphasize that the EFVI graphic can assume any form that, when produced on CVPFD 40 or another 3D cockpit display, graphically conveys an enhanced flight visibility requirement for an approached runway. Additionally, the appearance of flight visibility marker 70 will vary amongst different embodiments of cockpit display system 10 and CVPFD 40. In the example of FIG. 2, flight visibility marker 70 is generated as one or more forward portions 72 of a larger range ring, which is centered on the current A/C position and which is otherwise not displayed. Accordingly, flight visibility marker 70 may appear as two gently curved lines or arced segments 72(a)-(b), which are laterally separated by a central window 74. The provision of central window 74 minimizes the degree to which flight visibility marker 70 obscures runway graphic 66, approach light graphics 68, and other graphic elements of CVPFD 40. Approach light graphics 68 may successively pass through window 74 when the ownship A/C lands by head-on approach; that is, when the A/C remains substantially aligned with the centerline of the runway represented by graphic 66 through the approach.

When generating CVPFD 40, controller 12 (FIG. 1) determines the proper positioning of flight visibility marker 70 within the virtual, 3D environment of EFVS image 42. In one embodiment, controller 12 may perform two general steps or processes to determine the proper positioning of flight visibility marker 70 within EFVS image 42 of CVPDF 40. First, controller 12 may establish the enhanced flight visibility requirement associated with or assigned to a runway currently approached by the ownship A/C for landing purposes. Second, controller 12 may calculate or otherwise determine a ground location corresponding to the established flight visibility requirement. Afterwards, controller 12 may then generate CVPFD 40 to include flight visibility marker 70, as properly positioned in accordance with the determined ground location. Controller 12 may repeatedly perform these steps and update CVPFD 40 at a relatively rapid refresh rate to ensure that CVPFD 40 accurately reflects the real time or near real time flight environment of the ownship A/C.

Controller 12 can establish the enhanced flight visibility requirement assigned to the approached runway in a number of different manners. In certain embodiments, controller 12 can recall the flight visibility requirement from a database stored in memory 22. For example, navigation database 26 or terrain database 28 may contain approach charts corresponding to various different runways within range of the ownship A/C. The charts may set-out a Runway Visual Range (RVR) value or a status miles value for each runway, which may then be extracted by controller 12 and utilized as the required flight visibility value. In other embodiments, memory 22 may contain a multi-dimensional look-up table or other tool for recalling enhanced flight visibility requirements corresponding to different runways. Controller 12 can also establish the enhanced flight visibility requirement from pilot input data received via pilot interface 16, such as an alphanumeric keypad included on a Multi-Purpose Control Display Unit (MCDU). Alternatively, controller can establish the flight visibility requirement from data received wirelessly via datalink 14 and provided by Air Traffic Control (ATC) or another recognized command authority. In still further embodiments, a combination of the foregoing approaches may be utilized. For example, controller 12 may recall a default value for the enhanced flight visibility requirement for the approached runway from memory 22, while permitting the default value to be overridden by information received via pilot interface 16 or via datalink 14. In certain implements, controller 12 can also be configured to adjust a baseline flight visibility requirement value in relation to changes in weather conditions, in relation to runway conditions affecting braking action, and the like.

Figure 3:
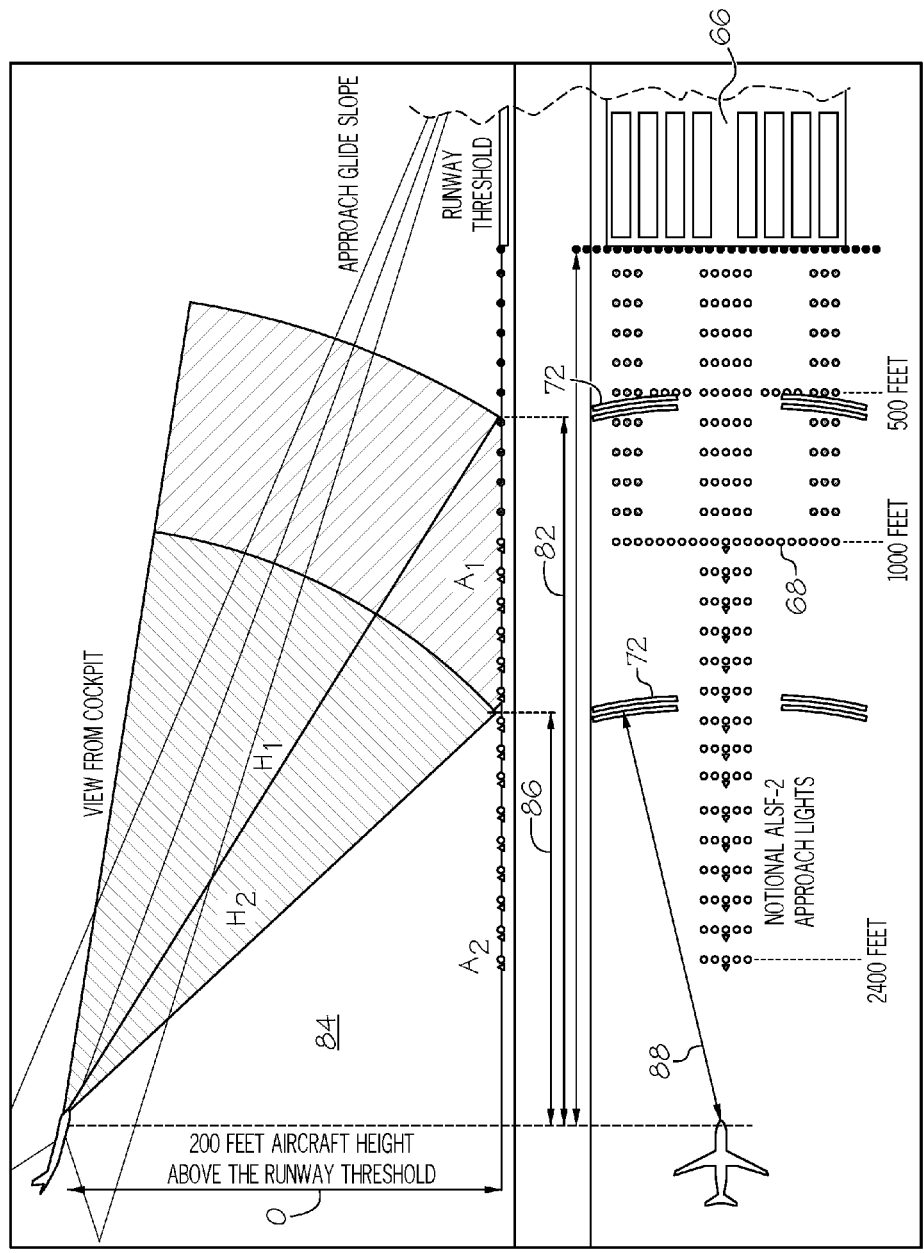
FIG. 3 is a conceptual diagram exemplary illustrating manners in which the positioning of the EFVI graphic can be determined when the EFVI graphic is generated as a flight visibility marker identifying a ground location beyond which the appearance of a runway reference feature satisfies the flight visibility requirement.

After establishing the enhanced flight visibility requirement for the approached runway, controller 12 then calculates or otherwise determines the corresponding ground location at which flight visibility marker 70 should be generated. FIG. 3 is a schematic diagram illustrating different manners in which the ground location of flight visibility marker 70 can be determined. Referring collectively to FIGS. 1-3, the ground location can be determined by first establishing the current A/C height above the runway threshold. In this regard, ground proximity sensor 30 (FIG. 1) can supply the current A/C height above ground level and, in instances wherein terrain database 28 indicates that a non-level surface topology is present between the runway threshold region and the ownship A/C, controller 12 can adjust the current A/C height above ground level in accordance with such non-level ground topology. Alternatively, if the height or altitude of the runway threshold is known (e.g., relative to sea level) and ground proximity sensor 30 provides the GPS coordinates of the A/C, controller 12 can calculate the differential between these two values to arrive at the current A/C height above the runway threshold region. Various other methods can also be employed by controller 12 to determine the current A/C height above the runway threshold in further embodiments.

In one implementation, controller 12 determines the ground location as a function of the current A/C height above the runway threshold and the value of the established flight visibility requirement. This can be accomplished by solving for the adjacent side of a right triangle including a (i) hypotenuse formed by a horizontal line extending toward the ownship A/C from the runway threshold region and (ii) an opposite side formed by vertical line extending downward from the ownship A/C to meet to the hypotenuse; as appearing herein, the term "vertical" defined as an axis parallel to the gravity vector, while the term "horizontal" is defined as an axis perpendicular to a vertical axis. Two examples are shown in FIG. 3. The first example is represented by a triangle 80 having three sides: (i) a hypotenuse "$H_1$," (ii) an adjacent side "$A_1$," and (iii) an opposite side "O." The length of the hypotenuse "$H_1$" is equal to the flight visibility requirement, which is established (e.g., extracted from an approach chart stored in memory 22) as an RVR value of 2400 feet in this example. The length of the opposite side "O" is the current A/C height above the runway threshold, which has been determined to be 200 feet. As the respective lengths of the hypotenuse "$H_1$" and opposite side "O" are known quantities, controller 12 need only solve for the length of an adjacent side "$A_1$" to determine the ground location at which flight visibility marker 70 should be placed. In this case, controller 12 determines that the length of adjacent side "A" to be 2392 feet, as indicated in FIG. 3 by arrow 82. Controller 12 then generates flight visibility marker 70 to be positioned in accordance with this value, as considered in the virtual 3D context of CVPFD 40 (FIG. 2). In the illustrated example wherein flight visibility marker 70 is generated as two forward portions 72(a)-(b) of a range ring centered on the current A/C position, the adjacent side "$A_1$" of triangle 80 serves as a radius of the range ring, as indicated in FIG. 3 by arrow 88.

The second exemplary scenario illustrated in FIG. 3 is conceptually represented by a smaller triangle 84, which is contained with larger triangle 80 and shares an overlapping opposite side therewith. As labeled in FIG. 3, triangle 84 includes the following sides: (i) a hypotenuse "$H_2$," (ii) an adjacent side "$A_2$," and (iii) an opposite side "O." In this example, the flight visibility requirement (RVR value) has decreased to 1400 feet, while the current A/C height above the runway threshold remains unchanged at 200 feet. It is thus known that the hypotenuse "$H_2$" of triangle 84 is 1400 feet in length, while the opposite side "O" of triangle 84 is 200 feet in length. Controller 12 may thus solve for the length of adjacent side "$A_2$" utilizing standard geometric or mathematical techniques. As indicated in FIG. 3 by arrow 86, controller 12 determines the length of adjacent side "$A_2$" of triangle 84 to be 1384 feet in this second example. In further embodiments of cockpit display system 10 (FIG. 1), controller 12 can determine the ground position of flight visibility marker 70 utilizing a different approach or technique.

Referring briefly again to exemplary CVPFD 40 shown in FIG. 2, approach light graphics 68 depict all the runway approach lights ahead of the runway approached by the ownship A/C. As noted above, this indicates that that the current range of EFVS sensor 34 exceeds the distance currently separating the ownship A/C and the threshold of the runway (or at least the final row of runway approach lights located closest to the runway). Thus, in the scenario illustrated in FIG. 2, the range of EFVS sensor 34 is relatively far-reaching and is likely more than sufficient to satisfy any published enhanced visibility requirements. It will often be the case, however, that the range of EFVS sensor 34 is curtailed by IMC or other low visibility conditions. In such cases, light approach graphics 68 will depict fewer than all of the runway approach on EFVS image 42 of CVPFD 40, as described below in conjunction with FIGS. 4 and 5.

Figure 4:
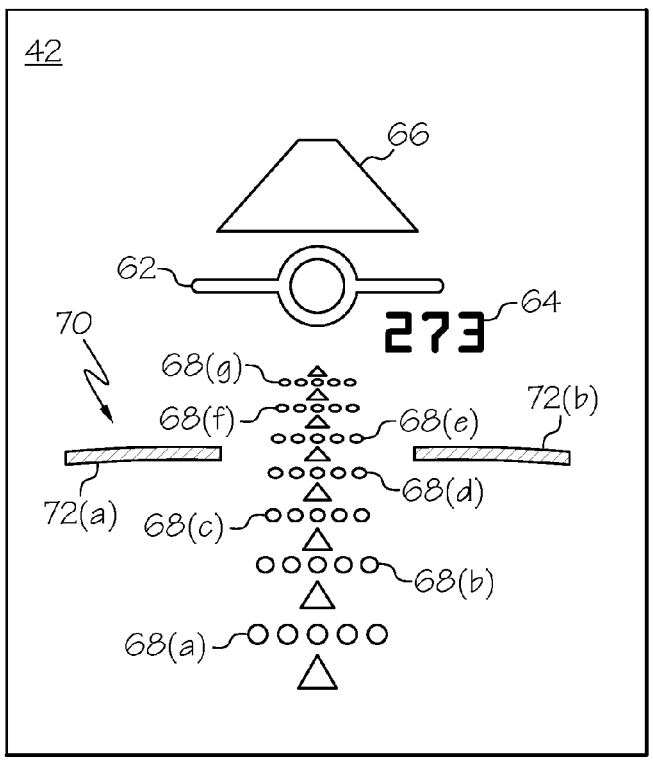
FIGS. 4 and 5 are simplified diagrams of the EFVS portion of the exemplary CVPFD shown in FIG. 2, as illustrated under different scenarios in which enhanced flight visibility requirements are and are not satisfied, respectively, on approach under IMC.
Figure 5:
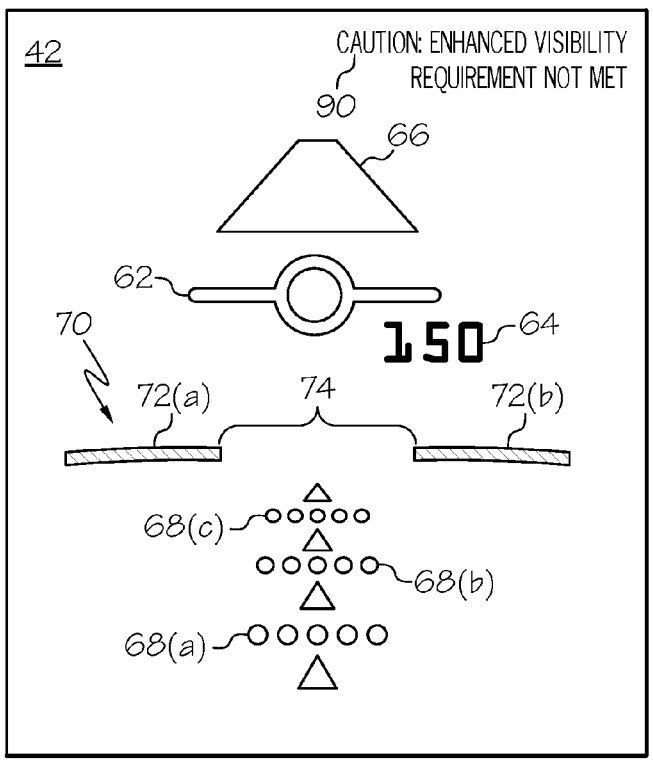

FIGS. 4 and 5 are simplified views of EFVS image 42 of CFPFD 40 under different scenarios in which enhanced flight visibility requirements are satisfied and are not satisfied, respectively, for a runway approached for landing under IMC. In the scenario illustrated in FIG. 4, graphics representative of seven rows of approach lights are shown and labeled as 68(a)-(g) with approach light rows 68(a) and 68(g) located closest to and furthest from the ownship A/C, respectively. As can readily be gathered by referring to FIG. 4, several approach light rows (e.g., rows 68(e)-(g)) are visible beyond or forward of flight visibility marker 70, as considered from the vantage point of the ownship A/C. A pilot referring to EFVS image 42 shown in FIG. 4 can thus quickly and intuitively conclude that the runway visibility requirement has been satisfied. Conversely, in the scenario shown in FIG. 5, no rows of approach light graphics are visible beyond flight visibility marker 70 as generated on EFVS image 42. EFVS image 42 (FIG. 5) thus provides a pilot with an intuitive visual cue that the runway visibility requirement is not currently satisfied. Accordingly, the pilot should consider rejecting the landing attempt if this continues to be the case as the ownship A/C approaches or descends below the decision altitude or height.

In the above-described manner, flight visibility marker 70 provides a convenient visual reference by which a pilot can quickly ascertain whether a particular flight visibility requirement has been met when flying an approach under IMC. In certain cases, controller 12 (FIG. 1) can alter the appearance of flight visibility marker 70 to visually convey additional pertinent information to the pilot pertaining to the enhanced flight visibility requirement. For example, controller 12 can establish a decision altitude (DA) for the approached runway by, for example, recalling the DA from memory 22 or by calculating the DA based upon current flight parameters. Controller 12 can then alter the appearance of the EFVI graphic based, at least in part, on the current altitude of the ownship A/C relative to the established DA. Furthermore, in certain embodiments, controller 12 can analyze EFVS image 42 to determine whether any approach light graphics 68 appear ahead of flight visibility marker 70, as considered from the vantage point of the ownship A/C. If determining that approach light graphics 68 do not appear ahead of flight visibility marker 70 as the ownship A/C descends below or is within a threshold distance of the DA, controller 12 may generate a visual caution alert or warning on CVPFD 40. For example, controller 12 may generate flight visibility marker 70 to have a pronounced appearance (e.g., increased dimensions) or otherwise draw the pilot's attention thereto; e.g., by applying a flashing effect or other animation effect to marker 70. In one embodiment, the caution alert is generated by altering the appearing of flight visibility marker 70 from a default format wherein marker 70 is color coded in an information color (e.g., white or green; represented in FIG. 5 by a first cross-hatching pattern) to a caution format wherein marker 70 is color coded in a pre-established caution color (e.g., amber; represented by a second cross-hatching pattern). Additionally or alternatively, a textual message or annunciation 90 describing the caution alert may be generated on CVPFD 40, as indicated in upper right corner of FIG. 5.

In further embodiments, cockpit display system 10 (FIG. 1) can generate other graphics or visual elements on EFVS image 42 or, more generally, CVPFD 40 indicating whether an enhanced flight visibility requirement for a runway approach by the ownship A/C is currently satisfied. In such embodiments, controller 12 of cockpit display system 10 can process the data provided by EFVS sensor 32 (FIG. 1) or analyze EFVS image 42 (FIGS. 2, 4, and 5) to establish the distance between a present position of the ownship A/C and the lighting signature located furthest from the present A/C position. This distance may then be compared with the enhanced visibility requirement for the approached runway to determine whether the enhanced visibility requirement is currently satisfied. After making this determination, controller 12 can then generate EFVS image 42 (or CVPFD 40) to include additional graphics or a text annunciation indicating whether the enhanced visibility requirement is satisfied for the approached runway. For example, if determining that an enhanced flight visibility requirement is not currently satisfied for an approached runway approach, controller 12 can generate EFVS image 42 to include a text annunciation similar or identical to annunciation 90 shown in FIG. 5. Conversely, if determining that an enhanced flight visibility requirement is currently satisfied, controller 12 can generate EFVS image 42 to include a corresponding text annunciation. In such embodiments, controller 12 of cockpit display system 10 may or may not generate EFVS image 42 to further include flight visibility marker 70.

The foregoing has thus provided embodiments of a cockpit display system and method for generating cockpit displays including symbology useful in assessing whether enhanced flight visibility requirements are satisfied during approach and landing. Embodiments of the above-described cockpit display system supplement an EFVS image with additional visual information indicating whether enhanced flight visibility requirements are satisfied during approach and landing, especially when conducted under IMC. For example, an EFVI graphic may be generated on the EFVS image. The EFVI graphic can be a flight visibility marker, which identifies a ground location beyond which the appearance of a runway reference feature (e.g., a graphic symbolizing or depicting one or more runway approach lights) satisfies the flight visibility requirement. The EFVS image can be generated as standalone image or included in a CVS display, such as a CVPFD, which is produced various different types of display device devices (e.g., a HDD or HUD display device) when located within the cockpit of an A/C. In this manner, the EFVI graphic provides a definitive reference to determine the enhanced flight visibility thereby easing the mental burden on the pilot in a high workload environment. As an additional benefit, the EFVI graphic may help simplify the pilot's task of locating required visual references when conducting an EFVS approach under IMC or other low visibility conditions.

Although an exemplary embodiment of the present invention has been described above in the context of a fully-functioning computer system (e.g., cockpit display system 10 described above in conjunction with FIG. 1), those skilled in the art will recognize that the mechanisms of the present invention are capable of being distributed as a program product and, furthermore, that the teachings of the present invention apply to the program product regardless of the particular type of computer-readable media (e.g., floppy disc, hard drive, memory card, optical disc, etc.) employed to carry-out its distribution. In certain implementations, the cockpit display system may comprise graphical user interface (e.g., ARINC 661) components, which may include a user application definition file ("UADF"). As will be appreciated by one skilled in the art, such a UADF is loaded into the cockpit display system and defines the "look and feel" of the display, the menu structure hierarchy, and various other static components of the graphic user interface.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A cockpit display system for deployment onboard an aircraft, the cockpit display system comprising:
   an Enhanced Flight Vision System (EFVS) sensor configured to monitor a region forward of the aircraft for runway reference features;

a cockpit display device on which an EFVS image is generated utilizing data received from the EFVS sensor; and a controller operably coupled to the EFVS sensor and to the cockpit display device, the controller configured to:
determine an enhanced flight visibility requirement for a runway approached by the aircraft for landing; and
visually indicate on the EFVS image whether the enhanced flight visibility requirement is currently satisfied for the runway approach by the aircraft.

2. The cockpit display system of claim 1 wherein, in visually indicating on the EFVS image whether the enhanced flight visibility requirement is currently satisfied for the runway approach by the aircraft, the controller is configured to generate an enhanced flight visibility indicator (EFVI) graphic on the EFVS image indicative of the enhanced flight visibility requirement.

3. The cockpit display system of claim 2 wherein the controller is configured to generate the EFVI graphic as a flight visibility marker, which visually identifies a ground location beyond which the appearance of a runway reference feature on the EFVS image satisfies the enhanced flight visibility requirement.

4. The cockpit display system of claim 3 further comprising one or more data sources coupled to the controller and configured to supply thereto data indicative of a current aircraft height above a threshold region of the runway, the controller configured to determine the ground location based at least in part on the enhanced flight visibility requirement and the current aircraft height above the threshold region of the runway.

5. The cockpit display system of claim 3 wherein the controller is configured to generate the flight visibility marker to have a central window through which graphics representative of runway approach lights can be seen when the aircraft is aligned parallel to and approaches the runway for landing.

6. The cockpit displays system of claim 3 wherein the controller is configured to generate the flight visibility marker as one or more arcs included in a larger, non-displayed ring centered on a current position of the aircraft.

7. The cockpit display system of claim 2 further comprising an altimeter indicating the current altitude of the aircraft, the controller coupled to the altimeter and further configured to:
establish a decision altitude for the runway approached by the aircraft for landing; and
alter the appearance of the EFVI graphic based, at least in part, on a current altitude of the aircraft relative to the established decision altitude.

8. The cockpit display system of claim 2 further comprising an altimeter indicating the current altitude of the aircraft, the controller coupled to the altimeter and further configured to:
determine whether any approach lights are detected by the EFVS sensor beyond the EFVI graphic, as considered from the vantage point of the aircraft;
establish a decision altitude for the runway approached by the aircraft for landing; and
generate a visual warning on the cockpit display device if determining that: (i) the aircraft has descended below or is within a threshold distance of the decision altitude, and (ii) no approach lights are detected by the forward-looking sensor beyond the flight visibility marker.

9. The cockpit display system of claim 1 further comprising a memory coupled to the controller and storing a database, the controller configured to determine the enhanced flight visibility requirement by recalling data from the database specifying the enhanced flight visibility requirement for the runway.

10. The cockpit display system of claim 9 wherein the data comprises a runway visibility requirement value or a status miles value included in an approach chart corresponding to the runway and stored in the database.

11. The cockpit display system of claim 1 further comprising a pilot interface coupled to the controller, the controller configured to determine the enhanced flight visibility requirement from pilot input data received via the pilot interface.

12. The cockpit display system of claim 1 further comprising a datalink coupled to the controller, the controller configured to determine the enhanced flight visibility requirement based, at least in part, on data received from a remote source over the datalink.

13. The cockpit display system of claim 1 wherein the controller is configured to combine the EFVS image with a Synthetic Vision System image to yield a Combined Vision Primary Flight Display generated on the cockpit display device.

14. The cockpit display system of claim 1 wherein the controller is further configured to:
determine whether the enhanced flight visibility requirement is currently satisfied for the runway approach by the aircraft based, at least in part, on the enhanced flight visibility requirement and a current position of the aircraft relative to the runway; and
generate the one or more graphics on the EFVS image indicative of whether the enhanced flight visibility requirement is currently satisfied for the runway approach by the aircraft.

15. The cockpit display system of claim 1 wherein, in generating the one or more graphics on the EFVS image, the controller generates the one or more graphics to comprise a text annunciation indicating whether the enhanced flight visibility requirement is currently satisfied for the runway approach by the aircraft.

16. A cockpit display system for deployment onboard an aircraft, the cockpit display system comprising:
a forward-looking sensor configured to monitor a region forward of the aircraft for runway approach lights;
a cockpit display device on which a three dimensional cockpit display is generated utilizing data received from the forward-looking sensor; and
a controller operably coupled to the forward-looking sensor and to the cockpit display device, the controller configured to:
determine an enhanced flight visibility requirement for a runway approached by the aircraft for landing; and
generate on the three dimensional cockpit display (i) approach light graphics representative of runway approach lights detected by the forward-looking sensor and (ii) a marker visually identifying a ground location beyond which the appearance of an approach light graphic satisfies the enhanced flight visibility requirement.

17. The cockpit display system of claim 16 further comprising one or more data sources coupled to the controller and configured to supply thereto data indicative of a current aircraft height above a threshold region of the runway, the controller configured to determine the ground location based at least in part on the enhanced flight visibility requirement and the current aircraft height above the threshold region of the runway.

18. The cockpit display system of claim 16 wherein the controller is configured to determine the enhanced flight visibility requirement based on one or more of the group consisting of a published enhanced flight visibility requirement stored in memory, pilot input, and data wirelessly received from Air Traffic Control.

19. A method carried-out by a cockpit display system onboard an aircraft, the cockpit display system including a cockpit display device, an Enhanced Flight Vision System (EFVS) sensor configured to monitor a region forward of the aircraft for runway reference features, and a controller operably coupled to the cockpit display device and to the forward-looking sensor, the method comprising:
   generating an EFVS image on the cockpit display device utilizing data received from the EFVS sensor;
   at the controller, determining an enhanced flight visibility requirement for a runway approached by the aircraft for landing; and
   producing an enhanced flight visibility indicator (EFVI) graphic on the EFVS image indicative of the enhanced flight visibility requirement.

20. The method of claim 19 wherein producing comprises producing the EFVI graphic as a marker, which visually identifies a ground location beyond which the appearance of a runway reference feature satisfies the enhanced flight visibility requirement.

* * * * *